(12) United States Patent
Emms

(10) Patent No.: US 6,295,939 B1
(45) Date of Patent: Oct. 2, 2001

(54) SEED PLANTER PRESS-WHEEL ASSEMBLY

(76) Inventor: Ronald Emin Arthur Emms, 14 Pulleine Avenue, Netherby, South Australia (AU)

( * ) Notice: Subject to any disclaimer, the term of this patent is extended or adjusted under 35 U.S.C. 154(b) by 0 days.

(21) Appl. No.: 09/570,472

(22) Filed: May 12, 2000

(51) Int. Cl.[7] .................................................. A01C 5/00
(52) U.S. Cl. .......................... 111/194; 172/519; 301/64.4
(58) Field of Search .................................. 111/190, 191, 111/194, 195, 189; 172/538, 518, 519; 301/64.4, 64.3

(56) References Cited

U.S. PATENT DOCUMENTS

| D. 412,711 | * | 8/1999 | Bruns | D15/29 |
|---|---|---|---|---|
| 1,105,665 | * | 8/1914 | Jefferis | 172/538 |
| 1,282,305 | * | 10/1918 | Simmons | 301/64.4 X |
| 1,579,044 | * | 3/1926 | Westley | 301/64.4 |
| 2,152,957 | * | 4/1939 | Fortney et al. | 301/64.4 |
| 2,731,900 | * | 1/1956 | Oehler | 172/538 |
| 4,273,057 | * | 6/1981 | Pollard | 111/85 |
| 4,398,478 | * | 8/1983 | Frase et al. | 111/85 |
| 4,537,449 | * | 8/1985 | Hayashi | 301/9 CN |
| 4,986,606 | * | 1/1991 | Thomas | 301/108 R |
| 5,533,793 | * | 7/1996 | Walker | 301/64.4 |
| 5,676,429 | * | 10/1997 | Johnson et al. | 301/64.7 |

FOREIGN PATENT DOCUMENTS

583446 * 12/1946 (GB) ................................. 172/538

* cited by examiner

Primary Examiner—Victor Batson
(74) Attorney, Agent, or Firm—Brown, Martin, Haller & McClain LLP

(57) ABSTRACT

The invention relates to a press-wheel assembly of the kind used with seed planting machines and which includes a press-wheel (11) formed by a pair of mating wheel halves (11', 11"), the inner wheel half (11') being provided with an integrally formed hub (13) which projects through a central bore formed in the outer wheel half (11"), the projecting hub portion being constructed and arranged so as to permit the fitment of a protective end cap (14) within its open outer end. The cap (14) when fitted to the hub (13) has its skirt surrounded and thereby protected by the walls of the projecting hub portion. Openings (28) in the projecting hub portion are provided to allow the insertion of a hand tool for manually removing the end cap from the wheel hub. Desirably the cap (14) is secured to the inside of the hub by means of an interference fit.

11 Claims, 2 Drawing Sheets

SEED PLANTER PRESS-WHEEL ASSEMBLY

This invention relates to an improved press-wheel assembly of the kind used with seed-planting machines for covering deposited seed from the machine with soil.

BACKGROUND OF THE INVENTION

It is well known for seeders to employ a plurality of trailing arms each of which is provided with a press-wheel for pressing the soil displaced in creating a seed receiving furrow. It is common practice for press-wheels to be fitted with a protective hub cap which covers the end of the stub-axle on which the wheel is rotatably mounted for the purpose of preventing the ingress of dirt, grit etc into the hub of the wheel and in turn the wheel bearings. It is not uncommon for these caps to be dislodged when the machine is in operation. Once dislodged, the journalled end of the stub-axle and the bearings are exposed to contamination and subsequent bearing damage over a period of time. To address this problem, one known press-wheel construction incorporates a central bolt-on over cap which is secured to the outer face of the press-wheel, in the spoke region thereof, by means of a series of bolts. The over cap completely covers the journalled end of the press-wheel axle. The fitment of such an over-cap is very labour intensive and hence uneconomical from a manufacturing point of view.

It is also well known for press-wheels to be fitted with a separate hub and stub-axle arrangement, with the hub flange being fastened directly to the inner side of the press-wheel. The weight of such an assembly, due to the heavy-duty construction of the separate hub, is quite heavy and in situations where a seeder is fitted with a large number of such press-wheels, the additional overall weight of the machine is quite significant. It is desirable therefore for the weight of the press-wheel to be reduced.

SUMMARY OF THE INVENTION

It is the main object of the present invention therefore to provide an improved press-wheel assembly which is designed to protect its protective hub end-cap from being dislodged during use.

It is another object of the present invention to provide an improved press-wheel assembly which is of lightweight construction and avoids the use of a heavy separate hub member attached to the wheel.

Broadly, according to this invention, a press-wheel assembly comprises a press-wheel rotatable on an axle or shaft and which is formed by a pair of mating diametral inner and outer wheel halves which are securable together, the inner wheel half having an integrally formed hub, said hub having an open-ended axial outer hub portion which extends axially outwards from the central diametral plane of the wheel and projects through a central bore formed in the outer wheel half, the projecting hub portion being shaped and dimensioned so as to permit the fitment of a protective end-cap within its open outer end so that the cap, when thus fitted, has its peripheral wall surrounded by said projecting hub portion and is protected thereby, said hub portion having opening means formed therein to allow the insertion of a cap removal tool for manually removing the end-cap from the wheel hub.

Preferably, said opening means comprises at least one slot which extends axially inwards from the open outer end of the outer hub portion.

Desirably each of the diametral wheel halves is formed of cast aluminum, each having a centre hub region, a flanged outer rim and a solid web interconnecting the hub region and the rim. The two halves are normally fastened together by means of a plurality of securing bolts which pass through aligned holes formed in the solid webs of the two halves.

In a preferred embodiment of the invention, the projecting hub portion on the inner wheel half is of frustoconical shape and terminates in a pair of opposed arcuate lugs which, together, extend around a major portion of the outer periphery of the end-cap and protect it from being accidentally dislodged. The free-ends of the arcuate lugs are spaced apart so as to form the slot-like openings which are diametrically aligned. The openings allow the end-cap to be removed by the use of a hand lever tool, and also permit the insertion of a cotter-pin into the end of the shaft or axle in order to secure same against axial displacement which respect to the hub.

Preferably the end-cap is removably fastened to the inside of the outer hub portion by means of an interference fit. Generally this will require the assistance of a hand tool in order to knock the cap into position.

Preferably the outer wheel half is formed with an integrally formed outwardly projecting circular boss or skirt dimensioned so that when the two halves are fitted together, the outer end face of the boss or skirt approximately aligns with the base of the lugs on the projecting hub portion.

Generally, sealed bearings are fitted for journalling the wheel on the stub-axle; however, a non-sealed bearing arrangement could also be employed.

The feature of having an integrally formed hub on one of the wheel halves (rather than a separate hub attachment fitted to a one-piece wheel) with each half being formed of cast aluminum, enables the assembled press-wheel to be of a light-weight construction while the protective shroud formed by the projecting hub portion on the inner wheel half serves to protect the end-cap and minimise the likelihood of it being accidentally dislodged, eg when it is struck by an object or obstacle when the seeder is in use.

BRIEF DESCRIPTION OF THE DRAWINGS

In order to further explain the present invention a preferred embodiment thereof is described hereunder in some further detail with reference to and as illustrated in the accompanying drawings wherein:

FIG. 3 is a cross-section view of the assembled halves shown in FIG. 2; while

DETAILED DESCRIPTION OF THE PREFERRED EMBODIMENT

Figure 1:
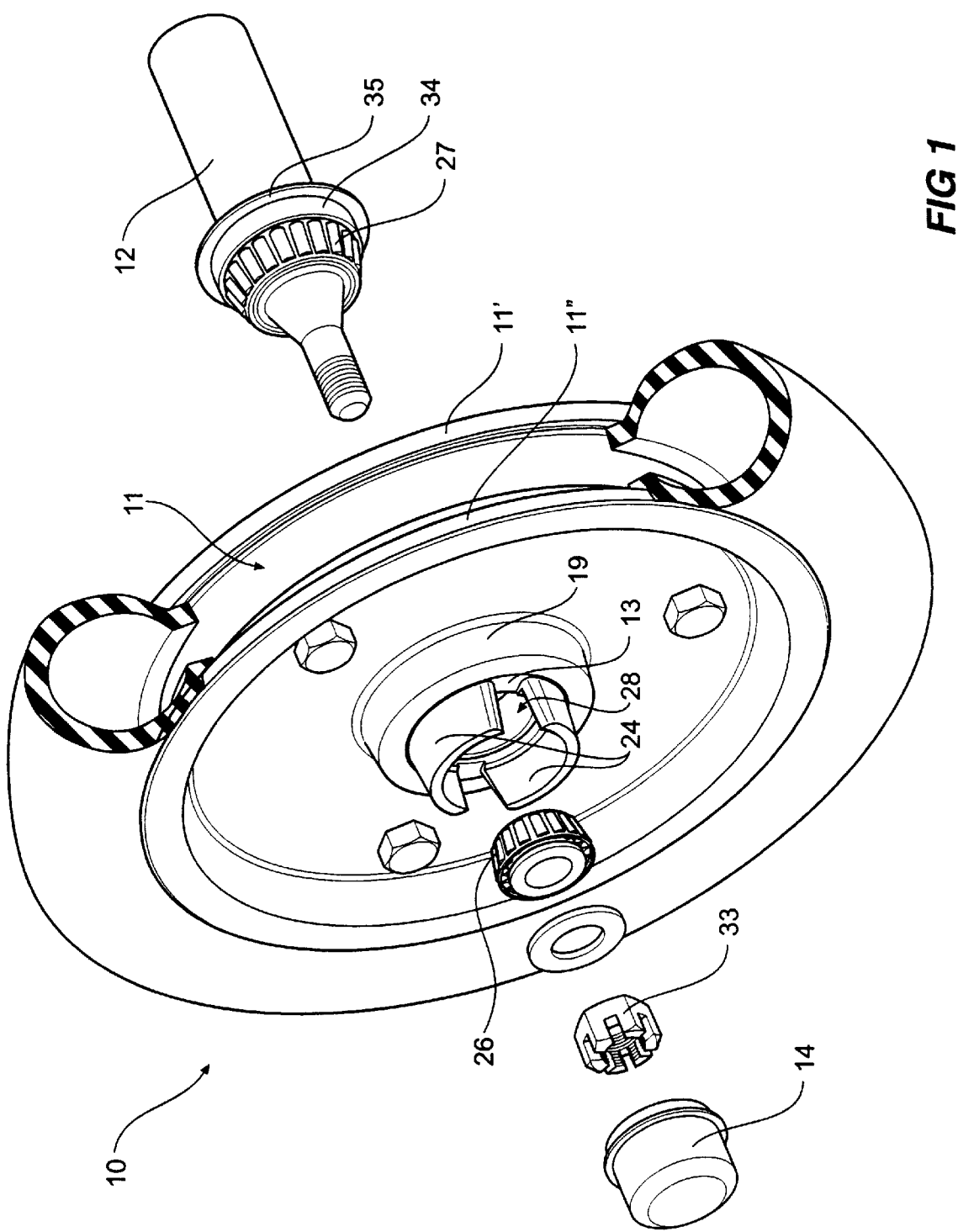
FIG. 1 is a fragmentary exploded view of a press-wheel assembly showing its stub-axle and bearings and the protective end-cap which is fitted to the outer end of the hub.

Referring to FIG. 1 of the drawings, a press-wheel assembly 10 comprises a press-wheel 11 which is journalled for rotation on a stub-axle or shaft 12 which has its outer end fitted to a central hub 13 on the wheel 11 and its other inner end mounted to the lower end of a trailing arm (not shown) which in turn has its leading end pivotally connected to a frame of a seed-planting implement which generally will include a ground engaging soil opener which is designed to create a furrow in the soil, with the press-wheel being in trailing relationship with the soil opener in order to close the furrows once seed has been deposited therein. The assembly 10 also includes a protective end-cap 14 which is removably fixed to the wheel hub 13 interiorly thereof, and which seals off the outer open end of the hub 13.

The press-wheel 11 is formed of two mating halves 11'11" each being of cast aluminum, with the inner wheel half 11' having the hub 13 integrally formed therewith, the hub 13 having an axial outer portion 16 and an axial inner portion 17, the portion 16 snugly locating through a tapered bore 18 formed in a central circular boss or skirt 19 integrally formed with the outer wheel half 11". The two halves 11' 11" are secured together in a face-to-face mating contact by means of a plurality of fastening bolts 20 which pass through aligned holes formed in the solid radial webs 21, 22 which extend between the centres and the rims of the wheel halves 11'11" respectively. Clamping nuts 23 threadably engage the bolts 20 in order to clamp the two halves together.

In this embodiment, the outer cylindrical surfaces of the hub portions 16, 17 and the boss 19 are slightly tapered— mainly for manufacturing convenience.

Figure 2:
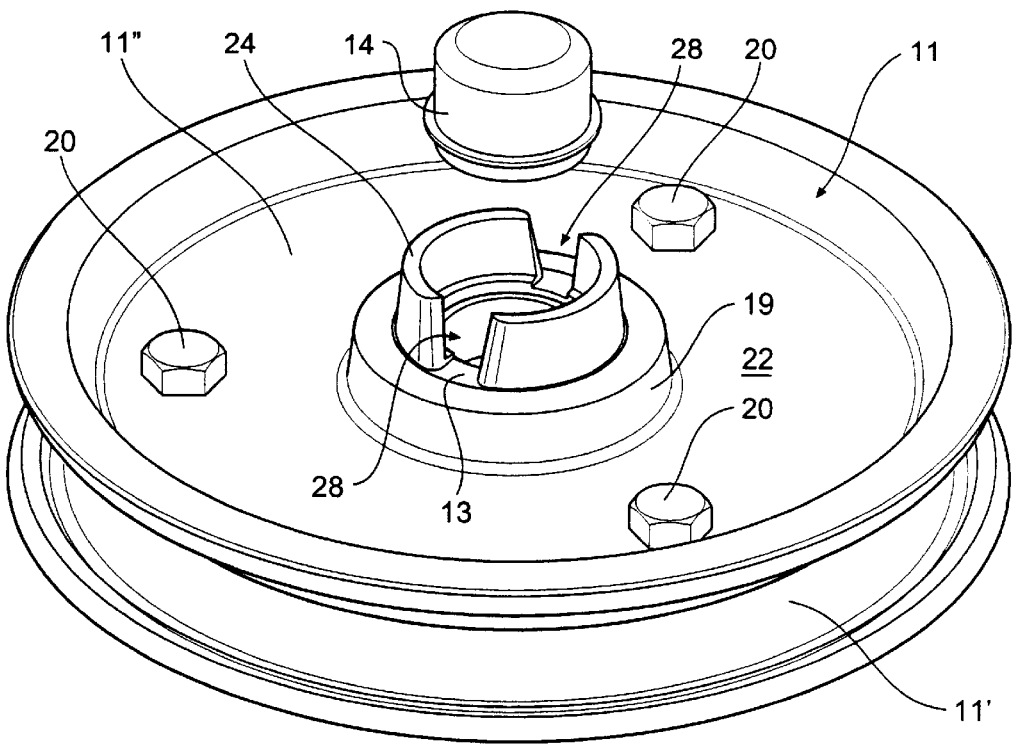
FIG. 2 is a perspective view of an assembled press-wheel (apart from its tyre) made in accordance with the present invention.
Figure 3:
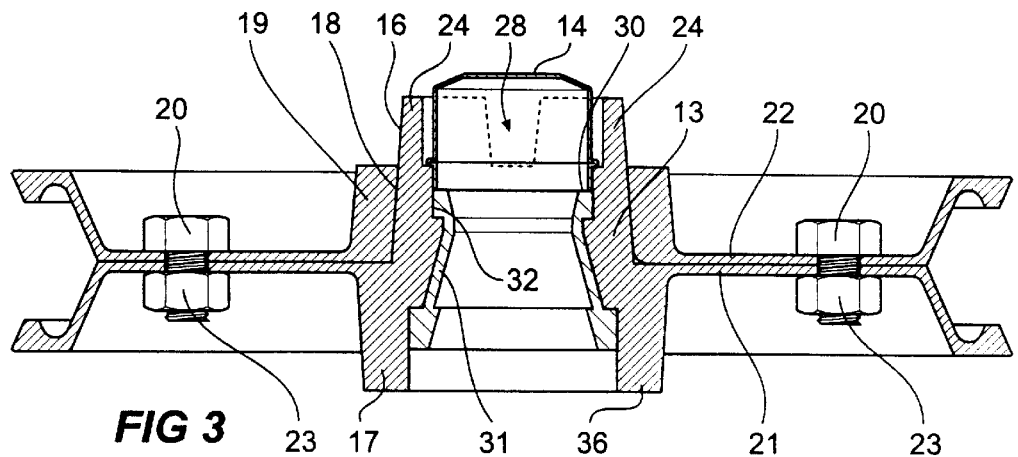
Figure 4:
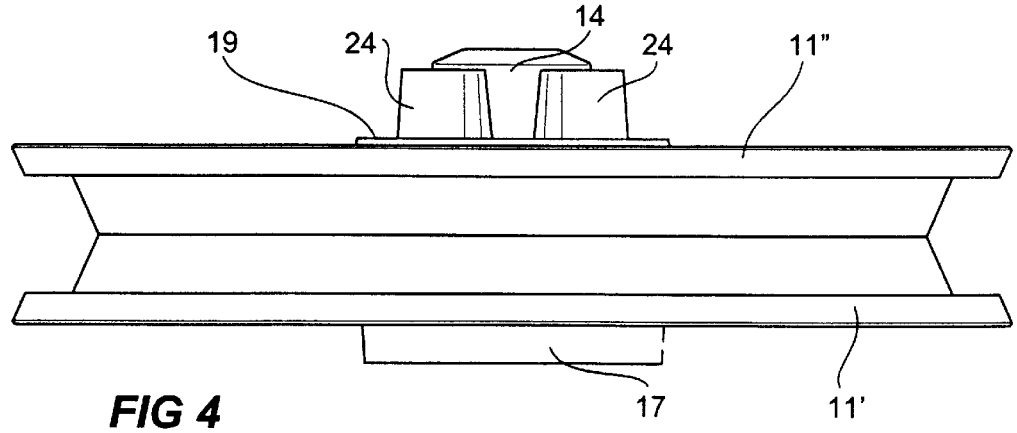
FIG. 4 is a side view of the wheel assembly shown in FIG. 2.

As shown in FIGS. 2 and 3 of the drawings, the outer hub portion 16 terminates in a pair of opposed arcuate lugs 24 which form a continuous axial extension of the hub portion 16, the lugs 24 projecting beyond the outer end face of the annular boss 19 by a distance sufficient so that the protective end-cap 14, when fitted in position, is substantially encircled by the lugs 24 so as to protect the cap 14 from external impact forces which might otherwise cause the cap to be accidentally dislodged when the press-wheel is in use. If the cap is dislodged, dirt and other debris can work its way into the interior of the hub and impair the function of the bearings 26, 27.

The inwardly extending slot-like openings 28 formed between the pairs of opposed ends of the lugs 24 serve a dual purpose. Firstly the openings 28 allow a hand tool, such as a small pick or crow-bar, to engage the protective cap 14 to effect its removal from the hub 13, eg when the bearings are required to be greased. Secondly, they allow a cotter-pin (not shown) to be inserted radially through the end of the stub-axle or shaft 12 to prevent its separation from the wheel 11.

In this embodiment, the protective end-cap 14 is frictionally fitted to the hub 13 by means of an interference fit, with the axially inner end of the cap 14 seating against an annular end face 30 of a bearing sleeve 31 within the hub 13. Generally the cap is fitted in position by applying an impact force against the outer end of the cap so that it tightly engages with an interference fit, within the outer end of bore 32 of the hub 16.

As shown in FIG. 3, the bearing sleeve 31 is engaged by means of a press fit, and has oppositely tapered annular inner surfaces which form outer bearing contact surfaces for the bearings 26, 27.

The assembly of the press-wheel 11 is extremely simple; the two halves 11'11" are secured together by means of the fastening bolts 20, the stub-axle or shaft 12 together with the bearings 26, 27 are engaged within the hub 13 by means of a push fit, with the bearing 26 being retained in position by means of a retention nut 33 which is threaded onto the outer end of shaft 12, followed by fitment of the protective end-cap 14 to the hub 13 so as to seal off its outer end. The open inner end of the hub 13 is sealed off by virtue of the sealing engagement between an annular dust seal 34 on the inner end of the shaft 12 and the shaft 12, with the seal 34 having a flange 35 which abuts against the annular end face 36 of the inner hub portion 17.

A brief consideration of the above described embodiment will indicate the invention provides for an extremely simple, inexpensive, light-weight press-wheel assembly for use with seed-planting implements and which is designed to eliminate the need for a separate bolt on over-cap for the protection of the end grease cap against accidental dislodgement. The press-wheel design of the present invention also avoids the need to use a separate hub attachment for the wheel and in so doing provides a significant reduction in weight for the overall press-wheel assembly.

The claims defining the invention are as follows:

1. A press-wheel assembly comprising:
    a press-wheel rotatable on an axle or shaft and which is formed by a pair of mating diametral inner and outer wheel halves securable together by fastening means, the inner wheel half having an integrally formed axial hub which has an inwardly extending inner hub portion and an outwardly extending outer hub portion, said outer hub portion extending axially outwards from the central diametral plane of the wheel and projecting through a central bore formed in said outer wheel half, said outer hub portion terminating in walls defining an end closure cap locating recess,
    an end closure cap having a closed outer end wall and a peripheral skirt extending inwardly therefrom, said cap being removably attached to said axial hub within said recess, with its skirt surrounded by said recess defining walls.

2. A press-wheel assembly according to claim 1 wherein said recess defining walls having opening means formed therein to allow the insertion of a cap removal tool for manually removing the end-cap from the wheel hub.

3. A press-wheel assembly according to claim 2 wherein said recess defining walls comprise a pair of opposed arcuate lugs which, together, extend around a major portion of the periphery of said skirt and protect the end-cap from being accidentally dislodged.

4. A press-wheel assembly according to claim 3 wherein said arcuate lugs are circumferentially spaced apart so as to form said opening means.

5. A press-wheel assembly according to claim 4 wherein said opening means is defined by a pair of slot-like openings formed between the free ends of said arcuate lugs and which are diametrically aligned.

6. A press-wheel assembly according to claim 1 wherein said end closure cap is releasably attached to the outer end of said outer hub portion by means of an interference fit.

7. A press-wheel assembly according to claim 1 wherein said outer hub portion is of frusto-conical shape.

8. A press-wheel assembly according to claim 1 wherein each said wheel half is formed of cast aluminum, each having a centre hub region, a flanged outer rim and a solid web interconnecting said hub region and the rim.

9. A press-wheel assembly according to claim 8 wherein said fastening means comprises a plurality of securing bolts and associated nuts, said bolts passing through aligned holes formed in the solid webs of said two wheel halves.

10. A press-wheel assembly according to claim 3 wherein said outer wheel half is formed with an integral outwardly projecting circular boss dimensioned so that when said two halves are fitted together, the outer annular end face of said boss approximately aligns with the base of said arcuate lugs on the extending outer hub portion on the inner wheel half.

11. A press-wheel assembly according to claim 1 or claim 2 wherein said press-wheel is journalled for rotation on said axle or shaft by means of a pair of axially spaced apart inner and outer roller bearing assemblies, said bearing assemblies having roller bearings which make bearing contact with respective annular bore surfaces of a bearing sleeve fitted within the bore of said axial hub on the inner wheel half.

* * * * *